United States Patent Office 3,281,420
Patented Oct. 25, 1966

3,281,420
CARBOXYLIC ACID [2-(2-AMINO-4-AZIDO-6-PHEN-YL-5-PYRIMIDINYL) - 1 - METHYLETHYLIDENE] HYDRAZIDES AND INTERMEDIATE
Hans A. Wagner, Skokie, Ill., assignor to G. D. Searle & Co., Chicago, Ill., a corporation of Delaware
No Drawing. Filed Jan. 27, 1966, Ser. No. 523,275
7 Claims. (Cl. 260—256.4)

This invention relates to carboxylic acid [2-(2-amino-4 - azido - 6 - phenyl - 5 - pyrimidinyl) - 1 - methylethylidene]hydrazides, an intermediate thereto, and processes for the preparation thereof. More particularly, this invention provides new, useful, and unobvious chemical compounds of the formula

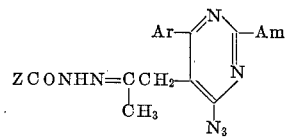

wherein Am represents an amino radical (—NH$_2$) which can be substituted by either 1 or 2 lower alkyl radicals; Ar represents a phenyl radical which can be substituted by 1 or more lower alkyl, halogen, and/or lower alkoxy radicals; and Z represents the indicated constituent of a carboxylic acid

selected from among alkanoic acids which can be sub-substituted by one or more cyano, cycloalkyl, phenyl, hydroxy, naphthyl, pyridyl, indolyl, and/or quinolyl radicals.

Typical lower alkyl radicals are methyl, ethyl, propyl, isopropyl, butyl, isobutyl, sec - butyl, tert - butyl, pentyl, neopentyl, hexyl, isohexyl, heptyl, and like monovalent, saturated, acrylic, straight- or branched-chain, hydrocarbon groupings of empirical formula

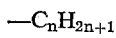

wherein $n$ represents a positive integer less than 8.

Phenyl substituents within the ambit of Ar can amount to as many as 5, alike or different, albeit 1 or 2 such substituents are ordinarily preferred. Disposition of these substituents on the benzene ring relative to each other and to its attachment to the pyrimidine nucleus is not critical.

Preferred embodiments of Z are hydrogen, cyclopropyl, cyclobutyl, cyclopentyl, cyclohexyl, phenyl, naphthyl (1 or 2), pyridyl (2, 3, or 4), indolyl (2 or 3), quinolyl (2, 3, or 4), and lower alkyl radicals such as methyl, ethyl, propyl, etc. which can be substituted as aforesaid to give rise to, for example, cyanomethyl, cyanoethyl, 2-cyanopropyl, hydroxymethyl, cyclopropylmethyl, 3 - cyclobutylpropyl, benzyl, diphenylmethyl, α - hydroxydiphenylmethyl, 1-naphthylmethyl, 2-naphthylmethyl, 3-indolylmethyl, 3-indolylethyl, and the like.

Those skilled in the art will recognize that 4 - azido-pyrimidino compounds are disposed, under favorable conditions to participate in a so-called azidomethinetetrazole equilibrium (Temple et al., J. Org. Chem., 30, 829 (1965)). The tetrazolo constituents of such an equilibrium mixture involving the instantly disclosed azidopyrimidino compounds have the formula

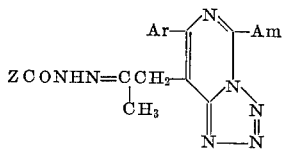

(Am, Ar, and Z retaining the meanings previously assigned); and the relative amounts of the two tautomeric forms of the subject compounds in existence under any given circumstance are dependent upon the physical state of the involved substances and their environment—whether they be solid or liquid and, if dissolved, in what solvent, at what temperature, and at what pH. Because the various forms in which tautomers exist cannot readily be represented by a single formula, the subject compounds are named and enformulated exclusively as azides *for convenience only;* both azido and tetrazolo forms, notwithstanding, are within the ambit of the described invention.

The compounds to which this invention relates are useful by reason of their valuable pharmacological properties. Thus, for example, they inhibit ulcer formation, reduce blood pressure, moderate exogenously-induced hypercholesterolemia, promote diuresis—both directly and by blocking the effects of desoxycorticosterone acetate on urinary sodium and potassium—and counteract inflammatory edema.

Preparation of the subject compounds proceeds as follows: An appropriate ethyl aroylacetate

and halide

(Ar being defined as before and X representing chlorine or bromine) are heated together in the presence of sodium hydride or lower alkoxide, using dimethyl sulfoxide as solvent, to give the corresponding substituted ester

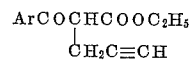

The latter ester, in turn, is condensed with an appropriate guanidine salt

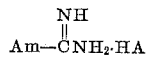

(Am being defined as before and A representing 1 equivalent of an appropriate anion such as chloride, carbonate, or sulfate) by heating in the presence of sodium methoxide, using ethyl or tert-butyl alcohol as solvent, to give the corresponding 4-pyrimidinol

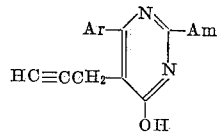

The pyrimidinol hydroxyl is replaced with chlorine via hot phosphorus oxychloride, and the resultant 4-chloropyrimidine is converted to the corresponding 4-azido compound by heating with sodium azide in dimethyl sulfoxide or aqueous ethyl alcohol. The propynyl side-chain therein is then hydrated with mercuric sulfate is aqueous sulfuric acid to give the acetonyl compound

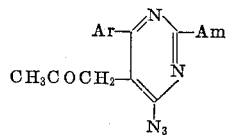

which, finally, is heated with an appropriate hydrazide

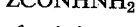

(Z being defined as before) in methanolic acetic acid to produce the desired compound of this invention.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

A. *2-amino-6-phenyl-5-(2-propynyl)-4-pyrimidinol*

A mixture of 230 parts of ethyl 2-benzoyl-4-pentynoate, 100 parts of guanidine hydrochloride, 56 parts of sodium methoxide, and 1200 parts of tert-butanol is heated at the boiling point under reflux for 18 hours, then stripped of solvent by vacuum distillation. The residue is mixed with 1500 parts of water, followed by 100 parts of glacial acetic acid. Insoluble solids are filtered off, washed with water, and dried in air. The product thus isolated is 2 - amino - 6 - phenyl - 5 - (2 - propynyl) - 4-pyrimidinol.

B. *2-amino-4-chloro-6-phenyl-5-(2-propynyl)-pyrimidine*

A mixture of 15 parts of 2-amino-6-phenyl-5-(2-propynyl)-4-pyrimidinol and 40 parts of phosphorus oxychloride is heated at the boiling point under reflux for 35 minutes, then stirred into 1000 parts of ice. Stirring is continued for 15 minutes, at which point sufficient aqueous ammonium hydroxide is introduced to render the mixture alkaline, temperature being maintained below 5° by concomitant addition of ice. The resultant mixture is stirred for 15 minutes, at the end of which time insoluble solids are filtered off, washed with water, dried in air, and taken up in ether. The ether solution is consecutively washed with dilute aqueous ammonium hydroxide and water, dried over anhydrous sodium sulfate, and filtered. The filtrate is treated with decolorizing charcoal and solvent thereupon removed by vacuum distillation. The crystalline residue is 2-amino-4-chloro-6-phenyl-5-(2-propynyl)-pyrimidine melting at 175–177°.

C. *2-amino-4-azido-6-phenyl-5-(2-propynyl)-pyrimidine*

A mixture of 20 parts of 2-amino-4-chloro-6-phenyl-5-(2-propynyl)pyrimidine, 7 parts of sodium azide, and 140 parts of dimethyl sulfoxide is stirred at 70° for 6 hours, whereupon heating is discontinued while stirring is maintained at room temperatures overnight. The resultant mixture is poured into 1400 parts of water, and the mixture thus obtained is stirred for 20 minutes. Insoluble solids are then filtered off, washed with cold water, dried in air, and taken up in the minimum amount of boiling methanol. The methanol solution is mixed with decolorizing charcoal and filtered. From the filtrate, on chilling, 2-amino-4-azido-6-phenyl-5-(2-propynyl)pyrimidine is precipitated as needles melting at approximtaely 190.5–191°.

D. *5-acetonyl-2-amino-4-azido-6-phenylpyrimidine*

To 54 parts of 2-amino-4-azido-6-phenyl-5-(2-propynyl)pyrimidine dissolved in 500 parts of aqueous 65% acetic acid is added, with agitation, 22 parts of concentrated sulfuric acid, followed by a solution prepared by adding 8 parts of mercuric sulfate to 40 parts of water and then mixing in, consecutively, 25 parts of concentrated sulfuric acid and 100 parts of aqueous 65% acetic acid. The resultant solution is heated at 80° with continued agitation for 2 hours, then filtered. The filtrate is poured into 3000 parts of ice and water, whereupon sufficient ammonium hydroxide is added to induce basicity. The insoluble solids thrown down are filtered off, washed with water, dried in air, and recrystallized from methyl alcohol to give 5-acetonyl-2-amino-4-azido-6-phenylpyrimidine melting at approximately 188–189°.

E. *Formic acid 1-(2-amino-4-azido-6-phenyl-5-pyrimidinyl)-2-methylethylidenehydrazide*

A mixture of 53 parts of 5-acetonyl-2-amino-4-azido-6-phenylpyrimidine, 18 parts of formic acid hydrazide, 20 parts of acetic acid, and 640 parts of methyl alcohol is heated at the boiling point under reflux for 4 hours, then treated with decolorizing charcoal and concentrated to ¼ volume by vacuum distillation. The filtrate is chilled and then diluted with 210 parts of ether. The solid precipitate thrown down is formic acid 1-(2-amino-4-azido-6-phenyl-5-pyrimidinyl) - 2 - methylethylidenehydrazide which, filtered off and dried in air, melts at 196–198°. The product has the formula

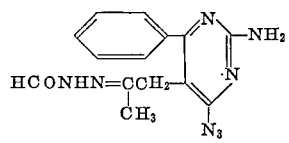

EXAMPLE 2

*Acetic acid 1-(2-amino-4-azido-6-phenyl-5-pyrimidinyl)-2-methylethylidenehydrazide.*—Substitution of 22 parts of acetic acid hydrazide for the formic acid hydrazide called for in Example 1E and increasing the amount of 5-acetonyl-2-amino-4-azido-6-phenylpyrimidine to 54 parts affords, by the procedure detailed in Example 1E, acetic acid 1-(2-amino-4-azido-6-phenyl-5-pyrimidinyl)-2-methylethylidenehydrazide melting at 211–213°. The product has the formula

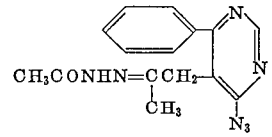

EXAMPLE 3

*Cyanoacetic acid 1-(2-amino-4-azido-6-phenyl-5-pyrimidinyl)-2-methylethylidenehydrazide.*—A mixture of 54 parts of 5-acetonyl-2-amino-4-azido-6-phenylpyrimidine, 22 parts of cyanoacetic acid hydrazide, 40 parts of acetic acid, and 800 parts of absolute ethyl alcohol is heated at the boiling point under reflux for 3 hours, then chilled. Cyanoacetic acid 1-(2-amino-4-azido-6-phenyl-5-pyrimidinyl)-2-methylethylidenehydrazide crystallizes out. The product, separated by filtration, washed with ether, and dried in air, melts at approximately 218–219° with gas evolution. It has the formula

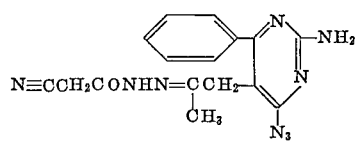

EXAMPLE 4

*Cyclopropanecarboxylic acid 1-(2 - amino - 4 - azido-6-phenyl-5-pyrimidinyl) - 2 - methylethylidenehydrazide.*—Substitution of 22 parts of cyclopropanecarboxylic acid hydrazide for the cyanoacetic acid hydrazide called for in Example 3 affords, by the procedure there detailed, cyclopropanecarboxylic acid 1-(2-amino-4-azido-6-phenyl-5-pyrimidinyl)-2-methylethylidenehydrazide melting at approximately 221–222° with gas evolution. The product has the formula

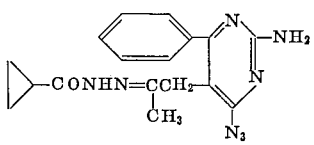

EXAMPLE 5

*Cyclohexanecarboxylic acid 1-(2-amino - 4 - azido - 6-phenyl-5-pyrimidinyl) - 2 - methylethylidenehydrazide.*—Substitution of 25 parts of cyclohexanecarboxylic acid hydrazide for the cyanoacetic acid hydrazide called for in Example 3 affords, by the procedure there detailed, cyclohexanecarboxylic acid 1-(2-amino-4-azido-6-phenyl-5-pyrimidinyl)-2-methylethylidenehydrazide, having the formula

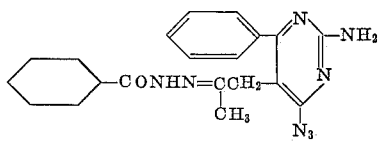

EXAMPLE 6

*Benzoic acid 1-(2-amino-4-azido-6-phenyl-5-pyrimidinyl)-2-methylethylidenehydrazide.*—Substitution of 25 parts of benzoic acid hydrazide for the cyanoacetic acid hydrazide called for in Example 3 affords, by the procedure there detailed, benzoic acid 1-(2-amino-4-azido-6-phenyl-5-pyrimidinyl) - 2 - methylethylidenehydrazide, having the formula

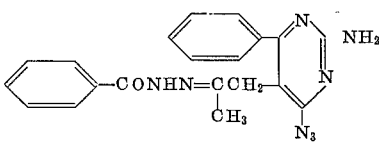

EXAMPLE 7

*Phenylacetic acid 1 - (2-amino-4-azido-6-phenyl-5-pyrimidinyl)-2-methylethylidenehydrazide.*—Substitution of 26 parts of phenylacetic acid hydrazide for the cyanoacetic acid hydrazide called for in Example 3 affords, by the procedure there detailed, phenylacetic acid 1-(2-amino-4-azido-6-phenyl-5-pyrimidinyl) - 2 - methylethylidenehydrazide, having the formula

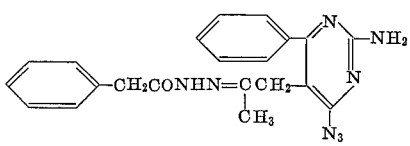

EXAMPLE 8

*1-naphthylacetic acid 1-(2-amino-4-azido-6-phenyl-5-pyrimidinyl)-2-methylethylidenehydrazide.*—A mixture of 54 parts of 5-acetonyl-2-amino-4-azido-6-phenylpyrimidine, 41 parts of 1-naphthyleneacetic acid hydrazide, 40 parts of acetic acid, and 960 parts of absolute ethyl alcohol is heated at the boiling point under reflux for 3 hours, then treated with decolorizing charcoal and filtered. The filtrate is distilled to ½ volume, then chilled. 1-naphthylacetic acid 1-(2-amino-4-azido-6-phenyl-5-pyrimidinyl)-2-methylethylidenehydrazide precipitates which, isolated by filtration, washed with ether, and dried in air, melts at approximately 182–183°. The product has the formula

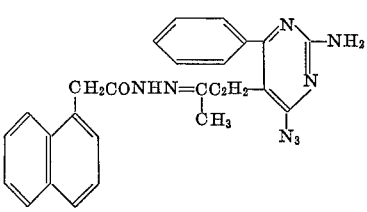

EXAMPLE 9

*Diphenylacetic acid 1-(2-amino-4-azido-6-phenyl-5-pyrimidinyl)-2-methylethylidenehydrazide.*—Substitution of 45 parts of diphenylacetic acid hydrazide for the 1-naphthyleneacetic acid hydrazide called for in Example 8 affords, by the procedure there detailed, diphenylacetic acid 1-(2-amino-4-azido-6-phenyl-5 - pyrimidinyl) - 2 - methylethylidenehydrazide, having the formula

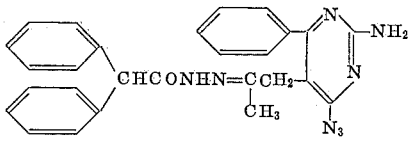

EXAMPLE 10

*Benzilic acid 1-(2-amino-4-azido-6-phenyl-5 - pyrimidinyl)-2-methylethylidenehydrazide.*—A mixture of 54 parts of 5-acetonyl-2-amino-4-azido-6-phenylpyrimidine, 49 parts of benzilic acid hydrazide, 40 parts of acetic acid, and 1200 parts of methyl alcohol is heated at the boiling point under reflux for 3 hours, then distilled to ½ volume. Approximately 140 parts of ether is thereupon introduced, and the resultant solution is chilled. Benzilic acid 1-(2-amino-4-azido-6-phenyl-5 - pyrimidinyl) - 2 - methylethylidenehydrazide precipitates. Filtered off and dried in air, it melts at approximately 194–195°. The product has the formula

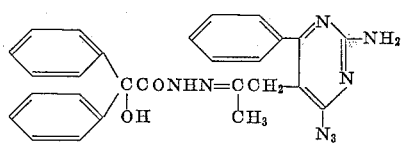

EXAMPLE 11

*Isonicotinic acid 1-(2-amino-4-azido-6-phenyl-5-pyrimidinyl)-2-methylethylidenehydrazide.*—A mixture of 54 parts of 5-acetonyl-2-amino-4-azido-6-phenylpyrimidine, 28 parts of isonicotinic acid hydrazide, 40 parts of acetic acid, and 1120 parts of absolute ethyl alcohol is heated at the boiling point under reflux for 3 hours, then treated (hot) with decolorizing charcoal and filtered. The filtrate is concentrated to ⅓ volume by vacuum distillation. From the concentrate, on chilling, isonicotinic acid 1-(2-amino-4-azido-6-phenyl-5-pyrimidinyl) - 2 - methylethylidenehydrazide crystallizes. Isolated by filtration, washed with ether, and dried in air, it melts at 218–220°. The product has the formula

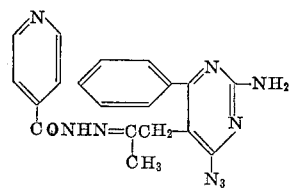

EXAMPLE 12

*Indole-3-acetic acid 1-(2-amino-4-azido-6-phenyl-5-pyrimidinyl)-2-methylethylidenehydrazide.*—A mixture of 54 parts of 5-acetonyl-2-amino-4-azido-6-phenylpyrimidine, 38 parts of indole-3-acetic acid hydrazide, 40 parts of acetic acid, and 960 parts of absolute ethyl alcohol is heated at the boiling point under reflux for 3 hours, then chilled. Indole-3-acetic acid 1-(2-amino-4-azido-6-phenyl-5-pyrimidinyl) - 2 - methylethylidenehydrazide precipitates. Isolated by filtration, washed with ether, and dried in air, it melts at approximately 218–219° with decomposition. The product has the formula

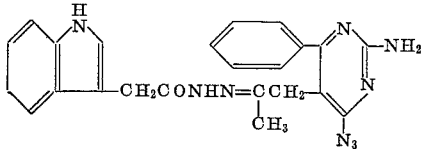

EXAMPLE 13

*Indole-3-propionic acid 1-(2-amino-4-azido-6-phenyl-5-pyrimidinyl)-2-methylethylidenehydrazide.*—A mixture of 54 parts of 5-acetonyl-2-amino-4-azido-6-phenylpyrimidine, 42 parts of indole-3-propionic acid hydrazide, 40 parts of acetic acid, and 1200 parts of absolute ethyl alcohol is heated at the boiling point under reflux for 3 hours, then chilled. Indole-3-propionic acid 1-(2-amino-4-azido-6-phenyl-5-pyrimidinyl)-2-methylethylidenehydrazide precipitates. Isolated by filtration, washed with ether, and dried in air, the product melts at approximately 204–205°. It has the formula

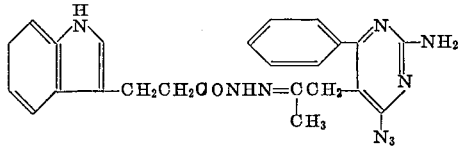

What is claimed is:
1. A compound of the formula

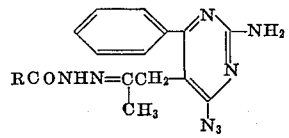

wherein R is selected from the group consisting of hydrogen, methyl, cyanomethyl, cycloalkyl containing more than 2 and fewer than 7 carbon atoms, phenyl, benzyl, naphthylmethyl, diphenylmethyl, α-hydroxydiphenylmethyl, pyridyl, indolylmethyl, and indolylethyl.

2. A compound according to claim 1 which is acetic acid 1-(2-amino-4-azido-6-phenyl-5-pyrimidinyl)-2-methylethylidenehydrazide.

3. A compound according to claim 1 which is cyclopropanecarboxylic acid 1-(2-amino-4-azido-6-phenyl-5-pyrimidinyl)-2-methylethylidenehydrazide.

4. A compound according to claim 1 which is 1-naphthylacetic acid 1-(2-amino-4-azido-6-phenyl-5-pyrimidinyl)-2-methylethylidenehydrazide.

5. A compound according to claim 1 which is benzilic acid 1-(2-amino-4-azido-6-phenyl-5-pyrimidinyl)-2-methylethylidenehydrazide.

6. A compound according to claim 1 which is indole-3-acetic acid 1-(2-amino-4-azido-6-phenyl-5-pyrimidinyl)-2-methylethylidenehydrazide.

7. 5-acetonyl-2-amino-4-azido-6-phenylpyrimidine..

No references cited.

ALEX MAZEL, *Primary Examiner.*

MARY U. O'BRIEN, *Assistant Examiner.*

UNITED STATES PATENT OFFICE
CERTIFICATE OF CORRECTION

Patent No. 3,281,420  October 25, 1966

Hans A. Wagner

It is hereby certified that error appears in the above numbered patent requiring correction and that the said Letters Patent should read as corrected below.

Column 1, line 37, for "acrylic" read -- acyclic --; column 2, line 57, for "is" read -- in --; column 4, lines 33 to 39, the second formula should appear as shown below instead of as in the patent:

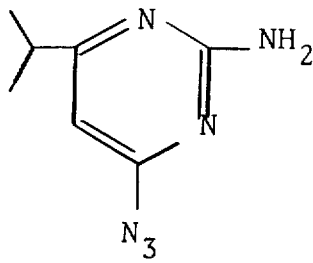

column 5, lines 61 to 69, the last formula should appear as shown below instead of as in the patent:

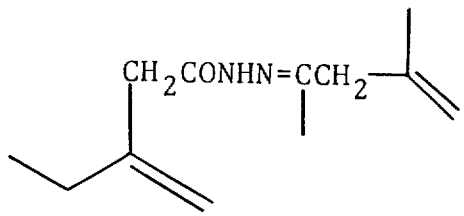

Signed and sealed this 5th day of September 1967.

(SEAL)
Attest:

ERNEST W. SWIDER
Attesting Officer

EDWARD J. BRENNER
Commissioner of Patents